United States Patent van Staalduinen

[11] Patent Number: 5,931,116
[45] Date of Patent: Aug. 3, 1999

[54] TEAT CUP ASSEMBLY FOR APPLICATION WITH A MILKING MACHINE

[76] Inventor: Pieter van Staalduinen, Scheeweg 2, 3155, RP, Maasland, Netherlands

[21] Appl. No.: 08/844,886

[22] Filed: Apr. 22, 1997

[30] Foreign Application Priority Data

May 6, 1996 [NL] Netherlands ............................ 1003036

[51] Int. Cl.⁶ ...................................................... A01J 5/06
[52] U.S. Cl. ....................................................... 119/14.47
[58] Field of Search .............................. 119/14.47, 14.48, 119/14.49, 14.5, 14.51, 14.52, 14.53

[56] References Cited

U.S. PATENT DOCUMENTS

| 125,692 | 2/1872 | Harner | 119/14.47 |
| 1,888,226 | 11/1932 | Hogeland | 119/14.53 |
| 2,164,706 | 7/1939 | Flint et al. | 119/14.47 |
| 4,269,143 | 5/1981 | Erbach | 119/14.49 |
| 5,482,004 | 1/1996 | Chowdhury | 119/14.52 |

FOREIGN PATENT DOCUMENTS

| 10300 | 11/1932 | Australia | 119/14.49 |
| 10461 | 12/1932 | Australia | 119/14.53 |

*Primary Examiner*—Michael J. Carone
*Assistant Examiner*—Elizabeth Shaw
*Attorney, Agent, or Firm*—Foley & Lardner

[57] ABSTRACT

Teat cup assembly for application with a milking machine, said tern cup assembly comprising; a teat receiving head (1), a teat lining (3) of flexible material connected with it, a limiter (4) mounted over a part of the length of the teat lining (3), and an outer sleeve (2) mounted at distance around said teat lining and being connected to the teat receiving head (1) and at a distance to the teat lining (3), said outer sleeve (2) being provided with a connection (7) for generating a vacuum in the space (8) between said teat lining (3) and the outer sleeve (2). The limiter (4) extends up to the receiving head (1) and is fixedly connected to it and is designed as a flexible, yet not or hardly extendible net or gauze, as a result of which enlargement of the teat lining diameter (3) is prevented.

6 Claims, 1 Drawing Sheet

TEAT CUP ASSEMBLY FOR APPLICATION WITH A MILKING MACHINE

BACKGROUND OF THE INVENTION

1. Field of the Invention

The invention relates to a teat cup assembly for application with a milking machine, said assembly comprising: a teat receiving head, a teat lining of flexible material connected with it, a limiter mounted over a part of the length of the teat lining, and an outer sleeve mounted at distance around said teat lining and being connected to the teat receiving head and at a distance to the teat lining, said outer sleeve being provided with a connection for generating a vacuum in the space between said teat lining and the outer sleeve.

2. Description of Related Art

Such a teat cup assembly is known from U.S. Pat. No. 4,269,143. In this known assembly, the limiter mounted on the teat lining is a sleeve slid onto the lining, said sleeve being made of an elastic material, just like the lining itself. Thus the limiter is able to move slightly in relation to the lining. The sleeve will not prevent the diameter of the teat lining from being larger during the section stroke than during the rest stroke. Only at the lower end of the limiter, the lining is provided with a protruding edge so that the limiter will not be able to slide away across the lining, to wit in the direction away from the receiving head. This will result in the fact, that a teat in the teat lining will be additionally loaded by creep of the teat lining. As a consequence, oedema could arise at the teat-udder junction.

Furthermore, the teat will get farther into the lining and will thus become additionally loaded during the rest stroke, since the circumference of the teat is larger than the inner circumference of the teat lining.

Further, U.S. Pat. No. 5,482,004 can be referred to, which shows a teat lining being provided with a reinforcement in the form of a rib extending helically around it, or ribs extending all round and spaced apart at some distance. Thus, enlargement of the teat lining diameter can hardly be prevented, whereas the effect of the ribs will be less great in the place between the ribs.

U.S. Pat. No. 2,164,706 discloses a teat cup assembly with a reinforcement in the form of a cotton cord which is mounted on the teat lining. Said cord is embedded in the material of the teat lining and is helically wound. The cord starts at some distance from the receiving head and is not suitable for preventing movement of the teat lining in longitudinal direction. Further, with this known assembly, the teat lining across the lower part thereof is completely in abutment with the outer sleeve and will not be slightly depressed on removing the underpressure in the space between it and the outer sleeve. As a result, its action will be completely different than that of the teat cup assembly according to the present invention.

BRIEF SUMMARY OF THE INVENTION

According to the invention, these objects are removed in that the limiter extends up to the receiving head and is fixedly connected to it and is designed as a flexible, yet not or hardly extendible net or gauze, as a result of which enlargement of the teat lining diameter is prevented.

The teat lining diameter will not be able to increase when a vacuum is generated within the teat lining and in the space between the teat lining and the outer sleeve. The teat lining will only get flattened. It has been proven that this prevents milk from being forced back into the udder during the transition from suction stroke to rest stroke.

BRIEF DESCRIPTION OF THE DRAWING

According to a preferred embodiment of a teat cup assembly according to the invention, the net or the gauze will be made of plastic.

The invention is further explained by way of an example, illustrated in the drawing, representing a longitudinal section across a teat cup assembly.

DETAILED DESCRIPTION OF THE INVENTION

Figure 1:
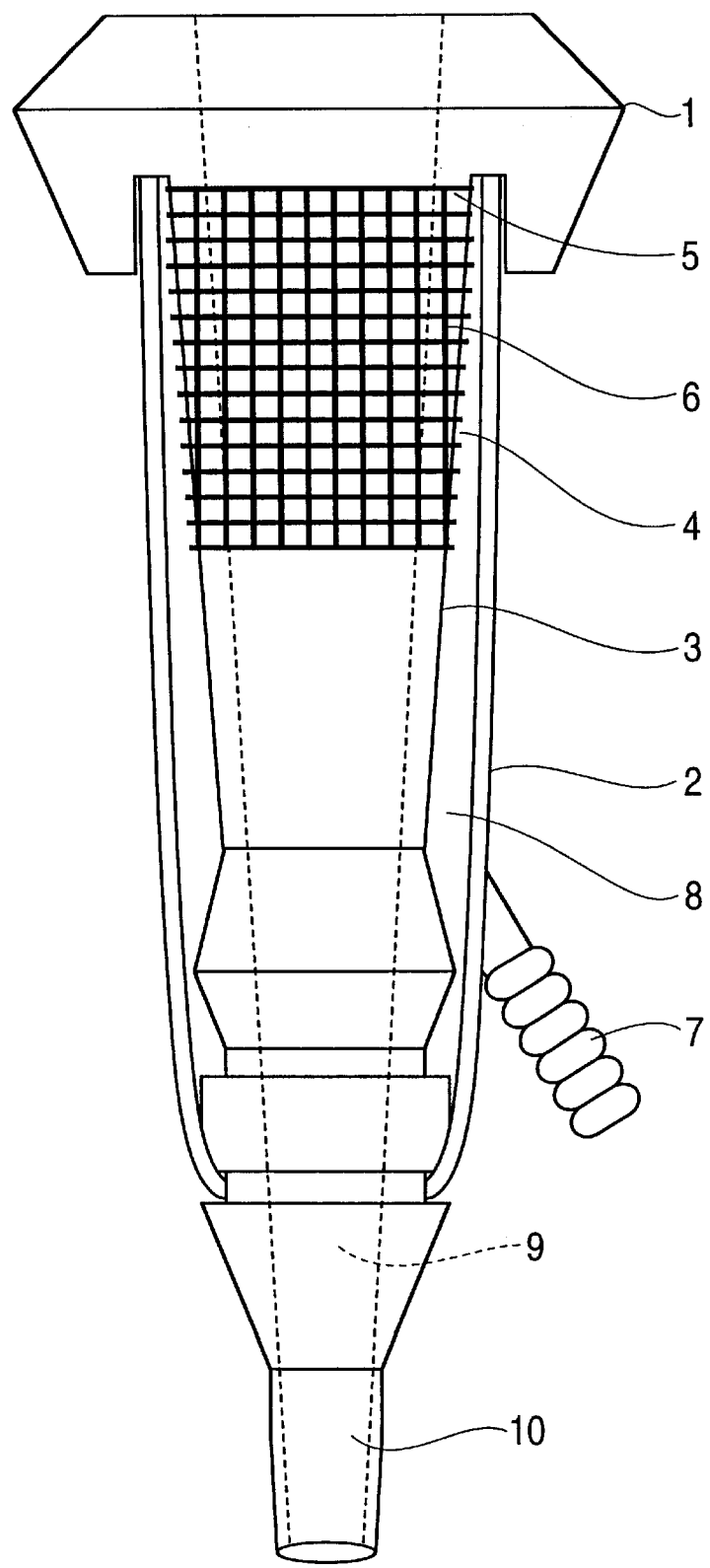

The teat cup assembly shown comprises a receiving head 1 to which an outer sleeve 2 and a teat lining 3 have been connected. Said teat lining 3 mounts the gauze 4 which has its upper end connected to a ring 5 in such a way that the gauze 4 is on the outer wall 6 of the teat lining 3. The ring 5 is connected to the receiving head 1. The outer sleeve 2 is provided with the connection 7 for generating a vacuum in the space 8 between the outer sleeve 2 and the teat lining 3. The internal space 9 of the teat lining 3 communicates with a drain 10 for the milk tapped from the teat.

It will be obvious that only one possible embodiment of a teat cup assembly according to the invention has been illustrated in the drawing and described above, and that many changes can be made without being beyond the inventive idea, as indicated in the appended claims.

I claim:

1. A teat cup assembly for application with a milking machine, said teat cup assembly comprising:

a teat receiving head, an elongated flexible teat lining connected with said receiving head, a limiter mounted over a part of the length of the teat lining, and an elongated outer sleeve encircling said teat lining and creating an annular space between said teat lining and said outer sleeve, said outer sleeve having a first longitudinal end connected to the teat receiving head and a second longitudinal end connected to the teat lining, said outer sleeve being provided with a connection for generating a vacuum in the space between said teat lining and the outer sleeve, wherein the limiter is fixedly connected to said receiving head and non-expandable net or gauze substantially preventing radial enlargement of the teat lining.

2. The teat cup assembly according to claim 1, wherein the net or the gauze is made of plastic.

3. A teat cup assembly for a milking machine, said teat cup assembly comprising:

a teat receiving head;

an elongated flexible teat lining having a proximal end connected to said receiving head and a distal end relative to said receiving head;

an elongated outer sleeve encircling said teat lining and creating an annular space between said teat lining and said outer sleeve, said outer sleeve having a first end connected to said teat receiving head and having a second end connected to said distal end, said outer sleeve further having a connection adapted for drawing a vacuum in said annular space; and a limiter substantially preventing radial enlargement of the teat lining, said limiter being connected to said receiving head and extending along a portion of said teat lining toward said distal end, said limiter including a flexible, substantially non-expandable net.

4. The teat cup assembly according to claim 3, wherein said net includes a plurality of interconnected segments.

5. The teat cup assembly according to claim 4, wherein said net includes an integrally molded plastic grid.

6. The teat cup assembly according to claim 3, wherein said net includes a gauze.

* * * * *